(12) United States Patent
Raghavan

(10) Patent No.: US 7,173,477 B1
(45) Date of Patent: Feb. 6, 2007

(54) VARIABLE CAPACITANCE CHARGE PUMP SYSTEM AND METHOD

(75) Inventor: Vijay Kumar Srinivasa Raghavan, Colorado Springs, CO (US)

(73) Assignee: Cypress Semiconductor Corp., San Jose, CA (US)

( * ) Notice: Subject to any disclaimer, the term of this patent is extended or adjusted under 35 U.S.C. 154(b) by 97 days.

(21) Appl. No.: 10/978,045

(22) Filed: Oct. 29, 2004

Related U.S. Application Data

(60) Provisional application No. 60/531,010, filed on Dec. 19, 2003.

(51) Int. Cl.
*G05F 1/10* (2006.01)

(52) U.S. Cl. ....................................... 327/536
(58) Field of Classification Search ................ 327/535, 327/536, 537; 363/60
See application file for complete search history.

(56) References Cited

U.S. PATENT DOCUMENTS

| | | | | |
|---|---|---|---|---|
| 5,140,182 A * | 8/1992 | Ichimura | ..................... | 327/536 |
| 5,499,183 A * | 3/1996 | Kobatake | ..................... | 363/59 |
| 5,574,634 A * | 11/1996 | Parlour et al. | ................. | 363/59 |
| 5,982,223 A * | 11/1999 | Park et al. | ................... | 327/536 |
| 6,175,264 B1 * | 1/2001 | Jinbo | ......................... | 327/536 |
| 6,292,048 B1 * | 9/2001 | Li | .............................. | 327/536 |
| 6,373,323 B2 * | 4/2002 | Kuroda | ....................... | 327/536 |
| 6,373,324 B2 * | 4/2002 | Li et al. | ..................... | 327/536 |
| 6,459,328 B1 * | 10/2002 | Sato | ........................... | 327/536 |
| 6,473,321 B2 * | 10/2002 | Kishimoto et al. | .......... | 363/59 |
| 6,486,729 B2 * | 11/2002 | Imamiya | ..................... | 327/536 |
| 6,545,529 B2 * | 4/2003 | Kim | ........................... | 327/536 |
| 2004/0246044 A1 * | 12/2004 | Myono et al. | .............. | 327/536 |

* cited by examiner

*Primary Examiner*—My-Trang Nu Ton
(74) *Attorney, Agent, or Firm*—Dale B. Halling

(57) ABSTRACT

A variable capacitance charge pump system has a charge pump circuit with a variable capacitance. A pump clock driver circuit has a clock signal and is coupled to an input of the charge pump circuit. A feedback system has an enable signal coupled to an input of the pump clock driver circuit.

18 Claims, 2 Drawing Sheets

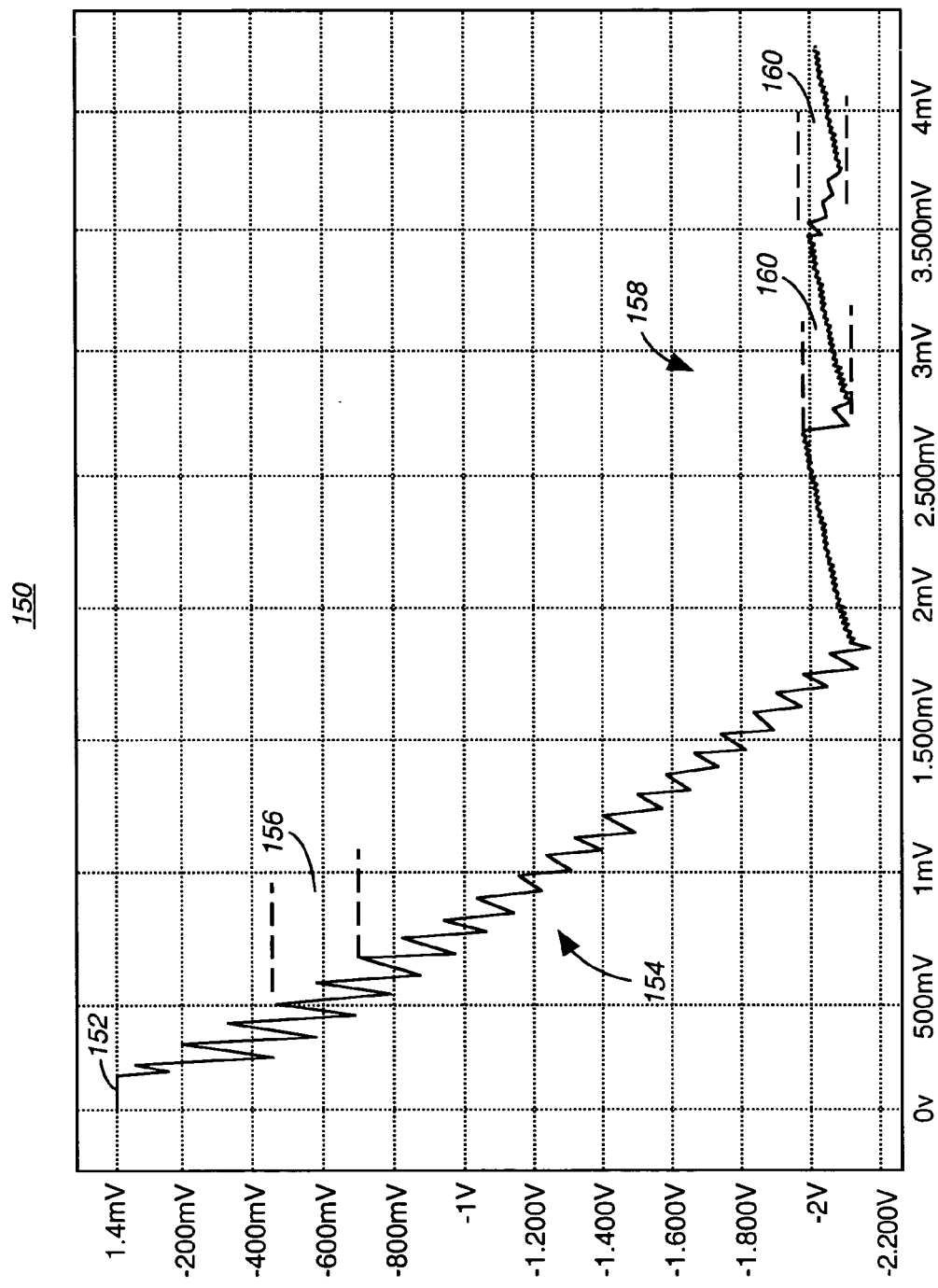

VARIABLE CAPACITANCE CHARGE PUMP SYSTEM AND METHOD

RELATED APPLICATIONS

The present invention claims priority on provisional patent application, Ser. No. 60/531,010, filed on Dec. 19, 2003, entitled "Low Ripple, Fast Turn-On Charge Pump Scheme Using Variable Capacitors".

FIELD OF THE INVENTION

The present invention relates generally to the field of charge pump circuits and more particularly to a variable capacitance charge pump system and method.

BACKGROUND OF THE INVENTION

Charge pumps are used to generate voltage levels (positive or negative) outside of the supply voltage rail levels. These higher than normal voltages are generated in a charge pump unit cell by dumping electric charge through the use of capacitors driven by clock driver circuits. Charge pumps typically have several stages of this charge pump unit cell to attain a particular high voltage. A feedback regulation scheme around the charge pump circuit makes sure the final output voltage is at the required level.

A conventional charge pump circuit uses a fixed value capacitor in the charge pump circuit. Conventional charge pumps have a tradeoff between low ripple and fast turn-on. For many charge pumps the turn-on time is not important, because the circuit is almost always on. However, in power saving applications it is necessary to power down the charge pump circuit often. As a result, the speed of the turn-on time becomes critical. Convention charge pumps either have a fast turn-on time or a low ripple for a given clock frequency and output load, but not both.

Thus there exists a need for a charge pump circuit that has both a fast turn-on time and a low voltage ripple at operating voltages for a given clock frequency and output load.

SUMMARY OF INVENTION

A variable capacitance charge pump system that overcomes these and other problems has a charge pump circuit with a variable capacitance. A pump clock driver circuit has a clock signal and is coupled to an input of the charge pump circuit. A feedback system has an enable signal coupled to an input of the pump clock driver circuit. In one embodiment there are a number of charge pump circuits cascaded together. The charge pump circuit may have more than two clock inputs. The charge pump circuit may have more than two capacitors coupled to the more than two clock inputs. The pump clock driver circuit may have a pair of delay/pulse logic circuits. One of the pair of delay/pulse logic circuits is coupled to a flip flop. One input to the flip flop may have a power signal.

In one embodiment, a method of operating a variable capacitance charge pump system includes the steps of determining if an output of a charge pump circuit is at an operating level. When the output of the pump circuit is not at the operating level, a high capacitance is selected for the charge pump circuit. When the output of the pump circuit is at the operating level, a low capacitance is selected for the charge pump circuit. It may be determined if a power-up condition exists. When the power-up condition exists, the high capacitance is selected for the charge pump circuit. A value of the high capacitance may be selected based on a start-up time. A value of the low capacitance may be selected based on a ripple requirement.

In one embodiment it is determining if an output of a number of charge pump circuits is at an operating level.

In one embodiment, a variable capacitance charge pump system has a charge pump circuit with a variable capacitance. A control circuit selects a capacitance level of the variable capacitance of the charge pump circuit. The system may have a number of charge pump circuits each with a variable capacitance. The control circuit may include an output level comparator. The control circuit may have a flip flop with an input coupled to an output of the output level comparator. The flip flop may have a reset input coupled to a power-on signal. The control circuit may have at least three clock output signals. The output of the output level comparator may be coupled to an input of the flip flop.

BRIEF DESCRIPTION OF THE DRAWINGS

FIG. 2 is a graph of the start-up time and voltage ripple of the variable capacitance charge pump system of FIG. 1.

DETAILED DESCRIPTION OF THE DRAWINGS

Figure 1:
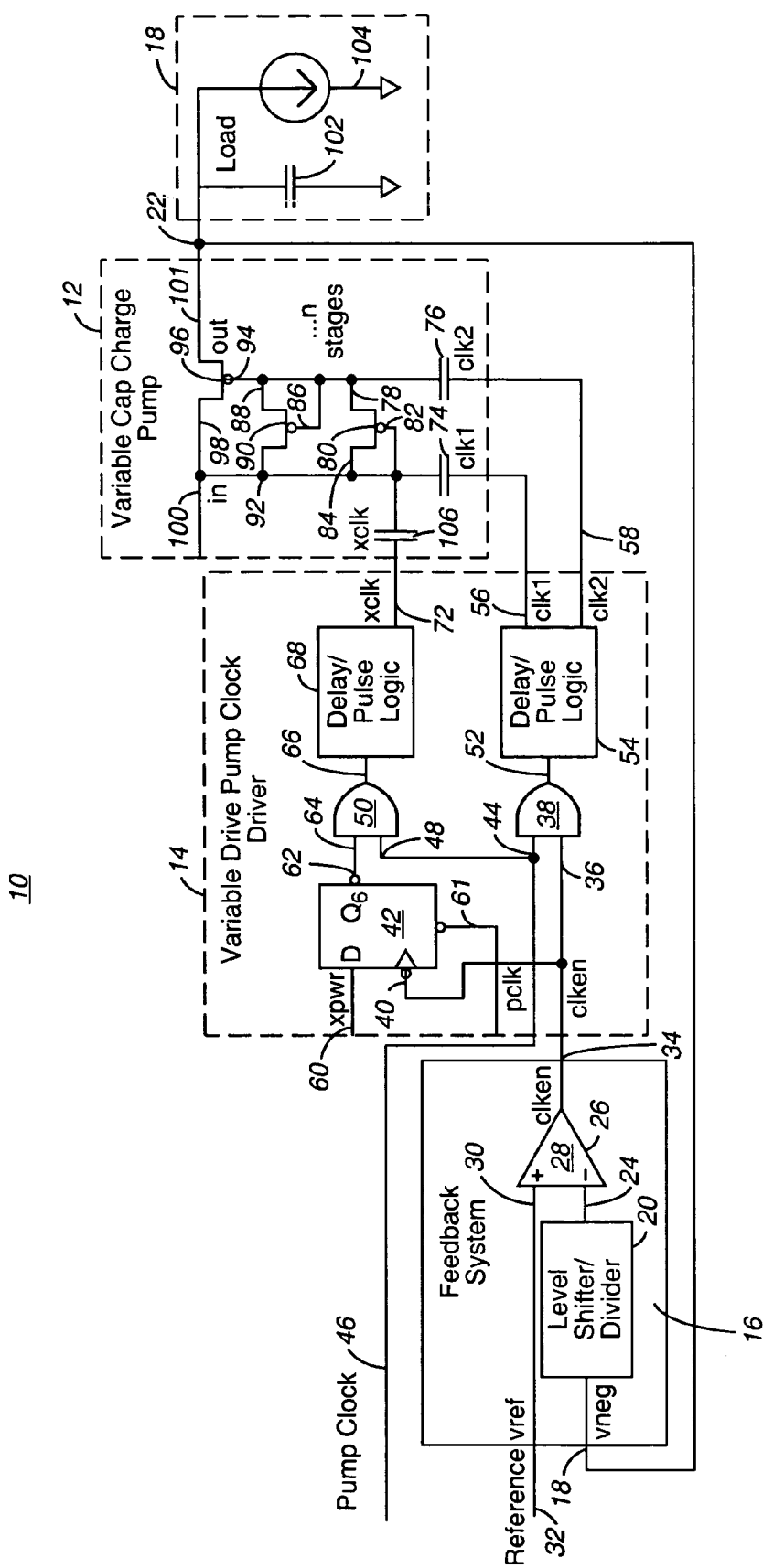
FIG. 1 is a block diagram of a variable capacitance charge pump system in accordance with one embodiment of the invention.

In embedded or mobile systems it is often important to be able to keep power consumption to an absolute minimum. As a result, these type of systems and circuits are powered down when not in use rather than being allowed to idle. When a charge pump is used in this environment, it is important that it achieve an operating voltage level as quickly as possible. It is also important that the charge pump system have a low operating voltage ripple. The invention described herein achieves both of these goals, fast start-up and low operating voltage ripple, by having a variable capacitance for the charge pump circuit. A larger capacitance is used during the start-up phase since this allows the charge pump to achieve a higher voltage in few pump cycles. A lower capacitance is used during the operating phase since it has a smaller operating voltage ripple.

FIG. 1 is a block diagram of a variable capacitance charge pump system 10 in accordance with one embodiment of the invention. The system 10 has three major parts, a charge pump circuit 12, a pump clock driver 14 and a feedback system 16. The pump clock driver 14 and the feedback system 16 together form a control circuit. The figure also shows a load 18 attached to the charge pump system 12. The feedback system 16 has a level shifter or divider 20 that is coupled to an output 22 of the charge pump circuit 12. The output 24 of the level-shifter/divider 20 is coupled to a negative input 26 of a comparator 28. A positive input 30 of the comparator 28 is coupled to a reference voltage 32. The reference voltage 32 is a stable voltage reference generated by some other circuit. The output 34 of the comparator 28 is an enable signal that forms an input to the variable drive pump clock driver 14.

The enable signal 34 is coupled to a first input 36 of an AND gate 38. The enable signal 34 is also coupled to a clock input 40 of a D-flip flop 42. The second input 44 of the AND gate 38 is coupled to a pump clock signal 46. The pump clock signal 46 is also coupled to a first input 48 of a second AND gate 50. The output 52 of the first AND gate 38 is coupled to a delay and pulse logic circuit 54. The delay/pulse logic circuit 54 generates a first clock signal 56 and a second clock signal 58. Note that the first clock signal 56 and the second clock signal 58 are standard clock signals for a charge pump circuit.

The D-flip flop 42 has a D-input coupled to power signal 60. A reset input 61 is coupled to a power up signal or other reset signal. The output 62 of the D-flip flop 42 is coupled to a second input 64 of the second AND gate 50. The output 66 of the second AND gate 50 is coupled to a second delay/pulse logic circuit 68. The output of the second delay/pulse logic circuit 68 is a single clock signal 72 which is a variable clock signal. When the variable clock signal 72 is enabled it is similar to the first clock signal 56.

The charge pump circuit 12 has three clock inputs a clock one signal 56, a clock two signal 58 and a variable clock signal 72. The clock one signal 56 is coupled to a first capacitor 74. The clock two signal 58 is coupled to a second capacitor 76. The other end of the second capacitor 76 is coupled to a source 78 of a first diode coupled transistor 80. The first diode coupled transistor 80 is a p-channel transistor. The gate 82 of the first diode coupled transistor 80 is coupled to the drain 84 of the first diode coupled transistor 80. The drain 84 is also coupled to a second end of the first capacitor 74.

The other end of the second capacitor 76 is also coupled to a gate 86 and drain 88 of a second diode coupled transistor 90. The second diode coupled transistor 90 is a p-channel transistor. A source 92 of the second diode coupled transistor 90 is coupled to a second end of the first capacitor 74.

The other end of the second capacitor 76 is also coupled to a gate 94 of a p-channel transistor 96. A source 98 of the p-channel transistor 96 is coupled to the source 92 of the second diode coupled transistor 90 and to the gate 82 and drain 84 of the first diode coupled transistor 80. The source 98 may also function as the input 100 to the charge pump circuit 12. The drain 101 forms the output of the charge pump circuit 12. Note that multiple charge pump circuits 12 may be cascaded to generate larger voltages. The output 101 is coupled to the load 18 represented as a capacitor 102 and a current source 104. Note that the diode coupled transistors 80 & 90 may be replaced by standard diodes.

The third clock or variable clock 72 is coupled to a third capacitor 106. The other end of the third capacitor 102 is coupled to the second end of the first capacitor 74, the gate 82 and drain 84 of the first diode coupled transistor 80, the source 92 of the second diode coupled transistor 90 and the input 100. Note that the charge pump circuit 12 represented is a negative voltage charge pump but the invention is equally applicable to a positive charge pump circuit.

In operation, when the power is switched on the charge pump circuit 12 has no charge stored in the capacitors. As a result, the output 22 when divided by the level-shifter/divider 20 will be less than the reference voltage 32. As a result, the comparator 28 will cause the enable signal 34 to be high. Once the enable signal 34 is high, the first AND gate 38 will have an output 52 that follows the pump clock 46. The first delay/pulse logic 54 will begin generating the clock one signal 56 and the clock two signal 58.

The D-flip flop 42 is clocked based on a falling edge of the enable signal 34. The D-flip flop 42 will be reset on power up. Since the D-flip flop 42 has not been clocked, the output 62 will be high. While the output 62 is high the second AND gate 50 will have an output 66 that follows the pump clock signal 46. The second delay/pulse logic 68 will begin generating the third clock signal 72. Since all three clock signals 56, 58 & 72 are operating all three capacitors 74, 76 and 106 will be building up charge. As a result, the larger capacitance will allow a fast rise time or start-up time for the charge pump circuit 12.

Once the output 22 of the charge pump circuit 12 is greater than the reference voltage 32, after being divided by the level-shifter/divider, the enable signal 34 will turn off. A low applied to the first input of the first AND gate 38 will cause the output 52 to go low. The low output will turn off the clock one signal 56 and the clock two signal 58. The enable signal 34 is also applied to the clock input 40 of the D-flip flop 42 as a result the D-flip flop is clocked. The power signal 60 applied to the D-input of the flip flop 42 is high which results in the output 62 going low. Since a low is applied to a second input 64 of the second AND gate 50 the output 66 will be a low. As a result, the third clock signal 72 turns off.

As the load 18 uses charge from the charge pump 12, the output 24 will fall below the reference voltage 32. This will turn the enable signal 34 on again. As a result, the output 52 of the first AND gate 38 will again track the pump clock signal 46. As a result, the clock one signal 56 and the clock two signal 58 will be on. However, the change in the enable signal 34 will have no effect on the D-flip flop 42 because it has not received a reset signal 61. The reset signal 61 is only sent at initial power up. As a result, the output 62 of the D-flip flop will be low. As a result, the second AND gate 50 will still have a low output and the third clock will remain off. Thus the system 10 has a high capacitance for the charge pump circuit 12 upon start-up or when the output 22 is outside an operating range. The system 10 has a low capacitance when the output 22 is within an operating range. The high capacitance allows the system 10 to have a fast start-up and the low capacitance provides a low voltage ripple for the output 22 in the operating range. As a result, the system 10 has a variable capacitance to meet the two requirements of fast start-up and a low voltage ripple.

FIG. 2 is a graph 150 of the start-up time and voltage ripple of the variable capacitance charge pump system of FIG. 1. At start-up 152 the initial output 22 of the charge pump circuit 12 is essentially zero volts. During the start-up phase 154 the voltage ripple 156 is large around 150 to 300 millivolts in this example. In the operating range 158 the peak to peak voltage ripple 160 is about 100 millivolts and a single voltage charging step is around 35 mV. If only the low capacitance was used by the system the start-up time or time to reach the operating voltage would be at least three times as long as shown in the graph. If only the large capacitance was used, the peak-to-peak voltage ripple in the operating condition would be at least three times that shown in the graph.

Note that the logic blocks that perform the feedback 16 and pump clock driver function 14 could be performed by a controller running a program. As a result, the present invention not only encompasses the specific circuitry shown herein but the general method of having a variable capacitance for a charge pump circuit. This variable capacitance may have discrete capacitance levels as shown herein with two or more levels or may be completely variable. One use for a variable capacitance charge pump circuit is to provide a fast start-up time and a low voltage ripple during operation. The value of the high capacitance and the low capacitance are then selected to meet the start-up time requirement and the low voltage ripple requirement during operation. In one embodiment, a method of operating a variable capacitance charge pump system includes the steps of determining if an output of a charge pump circuit is at an operating level. When the output the pump circuit is not at the operating level, a high capacitance is selected for the charge pump circuit. When the output of the pump circuit is at the operating level, a low capacitance is selected for the charge pump circuit. It may be determined if a power-up condition exists. When the power-up condition exists, the high capacitance is selected for the charge pump circuit. A value of the high capacitance may be selected based on a start-up time. A value of the low capacitance may be selected based on a ripple requirement.

In one embodiment it is determining if an output of a number of charge pump circuits is at an operating level.

Thus there has been described a charge pump system that has both a fast turn-on time and a low voltage ripple at operating voltages for a given clock frequency and output load.

The methods described herein can be implemented as computer-readable instructions stored on a computer-readable storage medium that when executed by a computer will perform the methods described herein.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A variable capacitance charge pump system comprising:
   a charge pump circuit having a plurality of capacitors;
   a pump clock driver circuit having at least three clock signals each of the at least three clock signals coupled to one of the plurality of capacitors of the charge pump circuit, wherein one of the at least three clock signals is controlled by a power-up signal; and
   a feedback system having an enable signal coupled to an input of the pump clock driver circuit.

2. The system of claim 1, wherein the pump clock driver circuit includes a flip flop with a reset input coupled to the power-up signal.

3. The system of claim 2, wherein the flip flop has a clock input coupled to the enable signal.

4. The system of claim 1, wherein the pump clock driver circuit has a pair of delay/pulse logic circuits.

5. The system of claim 4, wherein one of the pair of delay/pulse logic circuits is coupled to a flip flop.

6. The system of claim 4, wherein one input to the flip flop is a power signal.

7. A method of operating a variable capacitance charge pump system comprising the steps of:
   a) determining if an output of a charge pump circuit is at an operating level;
   b) when the output the pump circuit is not at the operating level, determining if a power-up condition exists; and
   c) when the power-up condition exists, selecting a high capacitance for the charge pump circuit.

8. The method of claim 7, wherein step (b) further includes the step of:
   b1) when the output the charge pump circuit is at the operating level, turning off all clocks to each of a plurality of capacitors.

9. The method of claim 7, wherein a value of the high capacitance is selected based on a start-up time.

10. The method of claim 7, wherein step (b) further includes the step of:
    b1) when the power-up condition does not exists selecting a low capacitance.

11. The method of claim 10, wherein a value of the low capacitance is selected based on a ripple requirement.

12. A variable capacitance charge pump system comprising:
    a charge pump circuit having a variable capacitance; and
    a control circuit selecting a capacitance level of the variable capacitance of the charge pump circuit, wherein the control circuit has a power-up signal as an input.

13. The system of claim 12, wherein the power-up signal controls an output of a clock signal.

14. The system of claim 12, wherein the control circuit includes an output level comparator.

15. The system of claim 14, wherein the control circuit has a flip flop with an input coupled to an output of the output level comparator.

16. The system of claim 15, wherein the flip flop has a reset input coupled to a power-on signal.

17. The system of claim 16, wherein the control circuit has at least three clock output signals.

18. The system of claim 17, wherein a clock input of the flip flop is an enable signal.

* * * * *